(12) United States Patent
Demas et al.

(10) Patent No.: US 8,050,330 B2
(45) Date of Patent: Nov. 1, 2011

(54) MULTIPLE TIME-BASE CLOCK FOR PROCESSING MULTIPLE SATELLITE SIGNALS

(75) Inventors: Jason Demas, Irvine, CA (US); Honman Law, Aliso Viejo, CA (US); David Baer, San Jose, CA (US); Brian Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1202 days.

(21) Appl. No.: 11/804,651

(22) Filed: May 17, 2007

(65) Prior Publication Data

US 2010/0020887 A1  Jan. 28, 2010

Related U.S. Application Data

(63) Continuation of application No. 10/374,734, filed on Feb. 24, 2003, now Pat. No. 7,230,987.

(60) Provisional application No. 60/414,800, filed on Sep. 30, 2002.

(51) Int. Cl.
*H04N 7/18* (2006.01)
(52) U.S. Cl. .............................. 375/240.28; 375/240.25
(58) Field of Classification Search . 375/240.01–240.29
See application file for complete search history.

*Primary Examiner* — Andy Rao
(74) *Attorney, Agent, or Firm* — Garlick Harrison & Markison; Bruce E. Garlick

(57) ABSTRACT

An integrated receiver with multiple, independently synchronized clock signals for multiple channel transport stream decoding and delivery substantially implemented on a single CMOS integrated circuit is described. An integrated circuit that services two satellite programs must generate and distribute corresponding time domain clocks to the various components of the integrated circuit. The transport block that receives one or more satellite signals from a demodulating block will extract program clock recover values from each signal being decoded and use these values to produce an error signal or control word that serves as an input to a clock generator. Based upon this input, the clock circuit will produce a corresponding time domain clock for each channel serviced by the integrated circuit. The output of the clock circuit is distributed to the various processing blocks within the integrated circuit that operate upon channel content received and processed by the transport block.

20 Claims, 11 Drawing Sheets

MULTIPLE TIME-BASE CLOCK FOR PROCESSING MULTIPLE SATELLITE SIGNALS

RELATED APPLICATIONS

This application is a continuation of U.S. Ser. No. 10/374,734, filed Feb. 24, 2003, and now issued as U.S. Pat. No. 7,230,987, which claims priority to the U.S. Provisional Application No. 60/414,800, which was filed on Sep. 30, 2002, all of which are incorporated herein by reference in their entirety.

BACKGROUND OF THE INVENTION

1. Field of the Invention

The present invention is directed in general to receivers for processing multiple input signals; and in particular a receiver for processing incoming multimedia programming.

2. Related Art

The present invention relates to transport, storage and/or display of compressed video and audio streams. Illustratively, the invention may be used in connection with the group of audio and video coding standards developed by MPEG ("Motion Pictures Coding Experts Group") that was published by the International Standards Organization ("ISO") as ISO/IEC 13818, and is referred to as the "MPEG-2" standard. See ISO/IEC IS 13818-2: Information Technology-Generic Coding of Moving Pictures and Associated Audio Information: Video; ISO/IEC DIS 13818-1: Information Technology-Generic Coding of Moving Pictures and Associated Audio Information: Systems. For compressed audio there are numerous standards including ISO/IEC IS 11172-2: 1993 Information Technology—Coding of Moving Pictures and Associated Audio for Digital Storage Media at up to about 1.5 Mbit/sec—Part 3 Audio (MPEG-1 Audio); Dolby AC-3; ISO/IEC DIS 13818-3: 1994 Information Technology—Coding of Moving Pictures and Associated Audio Information: Audio (MPEG-2 Audio). However, the present invention may also be used with other coding standards currently in existence or under development, such as the MPEG-4, MPEG-7, H.263, JPEG 2000 and/or MPEG-21 standards. The contents of the ISO documents are incorporated herein by reference.

FIG. 1 depicts an illustrative communications network for encoding, transmitting and decoding an audio-video signal, such as an analog NTSC, PAL or HDTV signal, which includes audio and video component signals. The audio and video streams for a program are separately encoded by encoder 15 to produce compressed audio and video streams. Such compressed video, compressed audio and private data signals are referred to as elementary streams. As illustrated, the encoder 15 includes a video processor 10 which receives the composite video. The digitized video signal input is processed by video processor 10 and provided as an output to an audio/video processor 30. An audio processor 20 receives PCM and BTSC audio signals. The audio signal is encoded by an audio processor 20. After audio processing, audio processor 20 provides an output to the audio/video processor 30. The encoder 15 also includes a CLK generator 40, a local bus interface 50, and a test control portion 60.

With coding standards, such as the MPEG-1 and MPEG-2 standards, data streams are hierarchically organized. The compressed audio and video streams from encoder 15 are illustratively placed in a higher layer stream such as an MPEG-2 compliant program or transport stream. Each program may include multiple video streams (e.g., multiple camera views) and multiple audio streams (e.g., different language audio). The higher layer transport or program stream provides a manner for associating all related encoded video, audio and private data streams so that they can be extracted, decoded and presented together in a coherent fashion. Furthermore, the higher layer stream may include compressed audio, video and private data for multiple programs. The transport stream encoding functionality may be implemented in audio/video processor 30, which acts as a transport stream encoder/multiplexer that receives elementary streams for a number of other programs and multiplexes the elementary streams of one or more programs into one or more transport streams. The higher layer stream (i.e., program or transport stream) may be stored in a storage device such as a digital video disc (DVD), video tape, magnetic disk drive, etc. Alternatively, the higher layer stream (i.e., transport stream) is transmitted via a transmission channel 65.

Before transmitting or storing the higher layer transport or program stream, the program or transport stream may be encapsulated in an even higher layer storage format or channel layer stream with channel encoder 35. Channel encoder 35 encapsulates the one or more transport streams into one or more channel layer streams. The channel layer streams outputted by the channel encoder 35 are then transmitted via a transmission channel 65. The transmission channel 65 may be a telephone network, a cable television network, a computer data network, a terrestrial broadcast system, or some combination thereof. As such, the transmission channel may include RF transmitters, satellite transponders, optical fibers, coaxial cables, unshielded twisted pairs of wires, switches, in-line amplifiers, etc.

The transmitted channel streams are received at a decoding receiver 70. At the decoding receiver, channel decoder 75 recovers the one or more transport streams from the received channel streams. The recovered transport streams are then inputted to a transport stream decode processor 80. The transport stream decode processor 80 extracts particular elementary streams from the inputted transport streams corresponding to one or more user selected programs. In addition, control data (which may include PCR (Program Clock Recovery) data, enable data, and start up values) is extracted from the bit stream and is used to control demultiplexing the interleaved compression layers, and in doing so defines the functions necessary for combining the compressed data streams. An extracted video signal elementary stream is inputted to a video decoder 85 and an extracted audio signal elementary stream is inputted to an audio decoder 90. The video decoder 85 decodes the video signal elementary stream and outputs a decompressed video signal. The audio decoder 90 decodes the audio signal elementary stream and outputs a decompressed audio signal. Illustratively, the decompressed video signal, the decompressed audio signal and private data signal may be combined to produce an NTSC, PAL or HDTV signal. The decompressed audio and video signals are converted analog signals by Video DAC 92 and Audio AC 94.

A. Elementary Streams

To better understand the considerations associated with decoding hierarchical encoded streams of audio and video, the elementary and transport stream layers are now discussed in greater detail. This discussion below focuses largely on video elementary streams. MPEG-2 provides for compressing video by reducing both spatial and temporal redundancy. A good tutorial for MPEG-2 video compression is contained in D. Le Gall, "MPEG: A Video Compression Standard for Multimedia Applications," Communications Of The ACM, April 1991, the contents of which are incorporated herein by reference. The encoder 80 shown in FIG. 2 includes a discrete cosine transform circuit (DCT) 83, a quantizer (Q) 85 and a variable length encoder circuit (VLC) 87. To spatially encode a picture, the picture is divided into blocks of pixels, e.g., 8×8 blocks of pixels. Each block of pixels is discrete cosine transformed to produce a number of transform coefficients. The coefficients are read out of the DCT 83 in a zig-zag fashion in relative increasing spatial frequency, from the DC coefficient to the highest vertical and horizontal spatial frequency AC coefficient. This tends to produce a sequence of coefficients containing long runs of near zero magnitude coefficients. The coefficients are quantized in the quantizer 85 which, amongst other things, converts the near-zero coefficients to zero. This produces coefficients with non-zero amplitude levels and runs (or subsequences) of zero amplitude level coefficients. The coefficients are then run-level encoded (or run length encoded) and entropy coded in the variable length encoder 87.

Blocks which are spatially encoded as described above are referred to as intrablocks because they are encoded based only on information self-contained in the block. An intrapicture (or "I picture") is a picture which contains only intrablocks. (Herein, "picture" means field or frame in accordance with per MPEG-2 terminology).

In addition to a spatial encoder, encoder 80 includes a temporal encoder 90 for reducing temporal redundancy. Temporal coding takes advantage of the high correlation between groups of pixels in one picture and groups of pixels in another picture of a sequence of pictures. Thus, a group of pixels can be thought of as moving from one relative position in one picture, called an anchor picture, to another relative position of another picture, with only small changes in the luminosity and chrominance of its pixels. In MPEG-2, the group of pixels is referred to as a block of pixels. In temporal coding, a block of pixels, in a picture to be encoded, is compared to different possible blocks of pixels, in a search window of a potential anchor frame, to determine the best matching block of pixels in the potential anchor frame. This is illustrated in FIG. 3a. A motion vector MV is determined which indicates the relative shift of the best matching block in the anchor frame to the block of the picture to be encoded. Furthermore, a difference between the best matching block and the block in the picture to be encoded is formed. The difference is then spatially encoded as described above.

Blocks which are temporally encoded are referred to as interblocks. Interblocks are not permitted in I pictures but are permitted in predictive pictures ("P pictures") or bi-directionally predictive pictures ("B pictures"). P pictures are pictures which each only have a single anchor picture, which single anchor picture is presented in time before the P picture encoded therewith. Each B picture has an anchor picture that is presented in time before the B picture and an anchor picture which is presented in time after the B picture. This dependence is illustrated in FIGS. 3a and 3b by arrows.

With such coding, pictures may be placed in the elementary stream in a different order than they are presented. For instance, it is advantageous to place both anchor pictures for the B pictures in the stream before the B pictures which depend thereon (so that they are available to decode the B pictures), even though half of those anchor pictures will be presented after the B pictures. While P and B pictures can have interblocks, some blocks of P and B pictures may be encoded as intrablocks if an adequate matching block cannot be found.

As seen from the foregoing, temporal encoding requires that the blocks of the anchor pictures be available for use in encoding. Thus, blocks which have been discrete cosine transformed and quantized are dequantized in inverse quantizer 91 and inverse discrete cosine transformed in inverse discrete cosine transform circuit 92. The reproduced blocks of pixels of the anchor pictures are stored in picture memory 94. If necessary to reconstruct the reproduced block of an anchor picture (e.g., a P picture), a previous block of pixels from a previous picture is added to the decoded block of pixels outputted by the IDCT 92 using adder 93.

During motion estimation coding, picture memory 94 outputs one or more search windows of pixels of the anchor pictures stored therein to motion estimator 95 which also receives an inputted macroblock of a picture to be temporally encoded. The motion estimator determines the best matching macroblock(s) in the search window(s) to the inputted macroblock and the motion vector(s) for translating the inputted macroblock to the best matching macroblock(s). The best matching macroblock(s) is subtracted from the inputted macroblock in subtractor 96 and the difference is spatially encoded by the spatial encoder 80. The motion vector is variable length encoded and multiplexed with the spatially encoded difference macroblock.

The amount of image compression during encoding varies by picture type. For example, I pictures often require significantly more bits than P and B pictures. In addition, the sequence of encoding inputted video pictures as I, P or B pictures can be arbitrary, or can follow a predetermined pattern, such as the MPEG-2 standard. As a consequence, while the encoded video elementary stream has a nominal average bit rate, the instantaneous bit rate can fluctuate. In contrast, the audio bit stream has a relatively constant bit rate. Differences in these bit rates require that the transport stream provide a mechanism for ensuring that both audio and video are timely presented so as to synchronize the video and audio of a particular program.

An additional timing issue arises by virtue of the fact that only I pictures can be independently decompressed, but that for decoding of P and B pictures, the anchor frames, on which they depend, must also be decompressed. This requires that the anchor pictures be decompressed in a timely fashion. As discussed below, the transport stream provides a mechanism for ensuring that anchor pictures are timely decoded.

B. Transport Streams

MPEG-2 provides two higher layer streams called the program stream and the transport stream. This invention is explained in the context of the transport stream because most storage and transmission uses of MPEG-2 compressed video and audio use the transport stream, thought the scope of the discussion should be sufficiently general for application to program streams and to recording and reproduction of program or transport streams using a storage device.

According to the MPEG-2 standard, the data of each digital elementary stream is first placed into program elementary stream (PES) packets, which may have an arbitrary length. The PES packet data, and other data, relating to one or more programs may be combined into one or more transport streams. The transport stream is organized into fixed length packets, each of which includes a four byte header and a 184 byte payload.

Each transport packet can carry PES packet data, e.g., private data or video or audio data (e.g., which may be compressed and formed into streams according to MPEG-2 syntax), or program specific information (PSI) data (described below). Private data may be placed in optional adaptation fields in the transport packet. Transport packets may not contain both PES packet data and PSI data. Furthermore, transport packets may only contain PES packet data for a single elementary stream.

Each transport packet is assigned a packet identification code or PID, which acts as a label for the transport packet so that all packets with a particular PID have related contents, e.g., all have particular PSI data, all have PES packet data for a particular elementary stream, etc.

In addition, PES bearing packets may also contain program clock reference (PCR) values, presentation time stamps (PTS) and decoding time stamps (DTS). The PCR is a snapshot of the encoder clock at the encoders which produced the elementary streams of a particular program. Since elementary streams for multiple programs produced at different times may be multiplexed into the same transport stream, it is not unusual to have divergent PCR values for the elementary streams associated with different programs.

The PTS, typically included in the PES header, indicates the time when a video picture or audio frame should be presented (i.e., displayed on a monitor or converted to sound on a loudspeaker) relative to the encoder clock (PCR) of the encoders which produced the video and audio. PTS's enable the synchronization of video and audio of a particular program despite the lack of instantaneous correlation between the video and audio bit rates.

The DTS indicates the time when a video picture should be decoded relative to the encoder clock. DTS's enable the timely submission of compressed anchor video pictures to the encoder for use in decoding interceded pictures which depend thereon.

Program specific information (PSI) data includes information other than elementary stream data which is necessary to decode the PES packet data, such as information for identifying which of plural transport streams contains the information for a specific program, information for locating elementary streams associated with specific programs, and conditional access information. For example, in networks wherein multiple transport streams are received, a Network Information Table (NIT) may be transmitted in each transport stream to indicate which programs are carried in each transport stream. Where program streams are modulated onto different "frequency channels" or carriers, the NIT also indicates on which carrier each transport stream is modulated. Thus, to identify the transport stream containing a program of interest, one need only access the NIT on any one of the transport streams.

Because each transport packet can only carry PES packet data for one elementary stream, the PSI is provided with a program association table (PAT) and program mapping table (PMT) to reconstitute elementary streams of a single program. The PMT, in turn, actually correlates all of the related elementary streams of each program for which the PMT contains an entry. In addition to program number and PID information, each PMT entry includes other information such as, the PID of the packets containing the PCR's for this program, the type of each stream, i.e., audio, video, etc.

C. Decode Timing

As seen from the foregoing, clock recovery and synchronization can pose significant challenges to the decompression of audio-video bit streams. For example, in the MPEG-2 standard, the Program clock reference (PCR) and the presentation and decoding time stamps (PTS/DTS) are used to re-assemble the elementary streams into a program. While the encoder and decoder will typically use system clocks having the same frequency (27 MHz in the case of MPEG-2 coders), a variety of transmission events can cause the decoder clock to lose synchronization with the encoder clock. As a result, the decoder clock can not be allowed to free run.

In the MPEG-2 standard, the encoder and decoder clocks are synchronized by the Program Clock Reference data field in the packet adaptation field of the PCR PID for the program, which is used to correct the decoder clock. The PCR is a 42 bit field that a PCR Base having a 33-bit value in units of 90 kHz, and a PCR extension having a 9-bit extension in units of 27 MHz, where 27 MHz is the system clock frequency. In operation, the first 42 bits of the first PCR received by the decoder are used to initialize the counter in a clock generator, and subsequent PCR values are compared to clock values for fine adjustment. In conventional systems, the difference between the PCR and the local clock can be used to drive a voltage controlled oscillator to speed up or slow down the local clock The presentation time stamp (PTS) and decoding time stamp (DTS) used to synchronize the audio and video by indicating the time that the presentation unit should be presented to the user. The PCR and PTS/DTS timing information arrives at the decoder at predetermined intervals, where the PCR arrives about every 10-100 milliseconds and about every 700 milliseconds for the PTS/DTS. In conventional decoders, the PCR and the local clock values are used to drive a voltage controlled oscillator which speeds up or slows down the local clock.

D. Technology Implementation

In addition to the complexity of the computational requirements for compressing and decompressing audio-visual information, such as described above, the ever-increasing need for higher speed communications systems imposes additional performance requirements and resulting costs for video processing systems. In order to reduce costs, communications systems are increasingly implemented using Very Large Scale Integration (VLSI) techniques. The level of integration of communications systems is constantly increasing to take advantage of advances in integrated circuit manufacturing technology and the resulting cost reductions. This means that communications systems of higher and higher complexity are being implemented in a smaller and smaller number of integrated circuits. For reasons of cost and density of integration, the preferred technology is CMOS.

Digital Signal Processing ("DSP") techniques generally allow higher levels of complexity and easier scaling to finer geometry technologies than analog techniques, as well as superior testability and manufacturability. However, DSP based communications systems require, for their implementation, an analog-to-digital converter ("ADC"). In many applications, the ADC is challenging to design, especially where critical clock signals must be generated at ever-increasing frequencies.

Conventional communications systems have derived chip clocks from external voltage controlled crystal oscillators ("VCXOs") controlled by pulse width modulated ("PWM") waveforms. Such systems are expensive to manufacture and assemble, and also have limited achievable accuracy, especially where automatic frequency control (AFC) loop techniques are used.

Conventional decoder systems are able to decode and display a single encoded program at a time. As a result, a decoder system, such a set-top box, is required for each display device. Alternatively, multiple decoder systems are required to simultaneously (1) receive and decode transmitted programs and (2) playback a locally stored program. There is a need to provide a decoding system for processing multiple signals for simultaneous display on one or more display devices. Conventionally known systems do not allow a user to perform such multitude of functions without increasing circuit area and power requirements. In fact, most conventional systems require separate set-top box decoders for each display device. Therefore, there is a need for a better system that is capable of performing the above functions without increasing circuit area and operational power.

Further limitations and disadvantages of conventional systems will become apparent to one of skill in the art after reviewing the remainder of the present application with reference to the drawings and detailed description which follow.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An apparatus and method in accordance with the present invention provides a system for processing multiple input signal streams to decode, deliver and display multiple audio-video programs simultaneously on multiple displays, such as television screens or computer monitors. In accordance with the present invention, a single integrated system includes multiple digital receivers, a data transport processor for processing multiple transport streams into encoded audio and video streams, an MPEG audio-video decoder for decoding multiple transport streams, a microprocessor, an interface to an external memory having a unified memory architecture and integrated display controllers for displaying the decoded audio and video on multiple independent monitors. Clock signals for the system are generated with external voltage controlled crystal oscillator controlled by PWM waveforms. Alternatively, system clock signals and other clock frequencies are synthesized by an integrated set of phase lock loop circuits controlled by program clock recovery control words extracted from the transport stream.

For purposes of this disclosure, the invention is illustrated herein for transport streams which are transmitted via a transmission channel. However, the scope of the discussion should be sufficiently general for application to program streams and to recording and reproduction of program or transport streams using a storage device.

Figure 1:
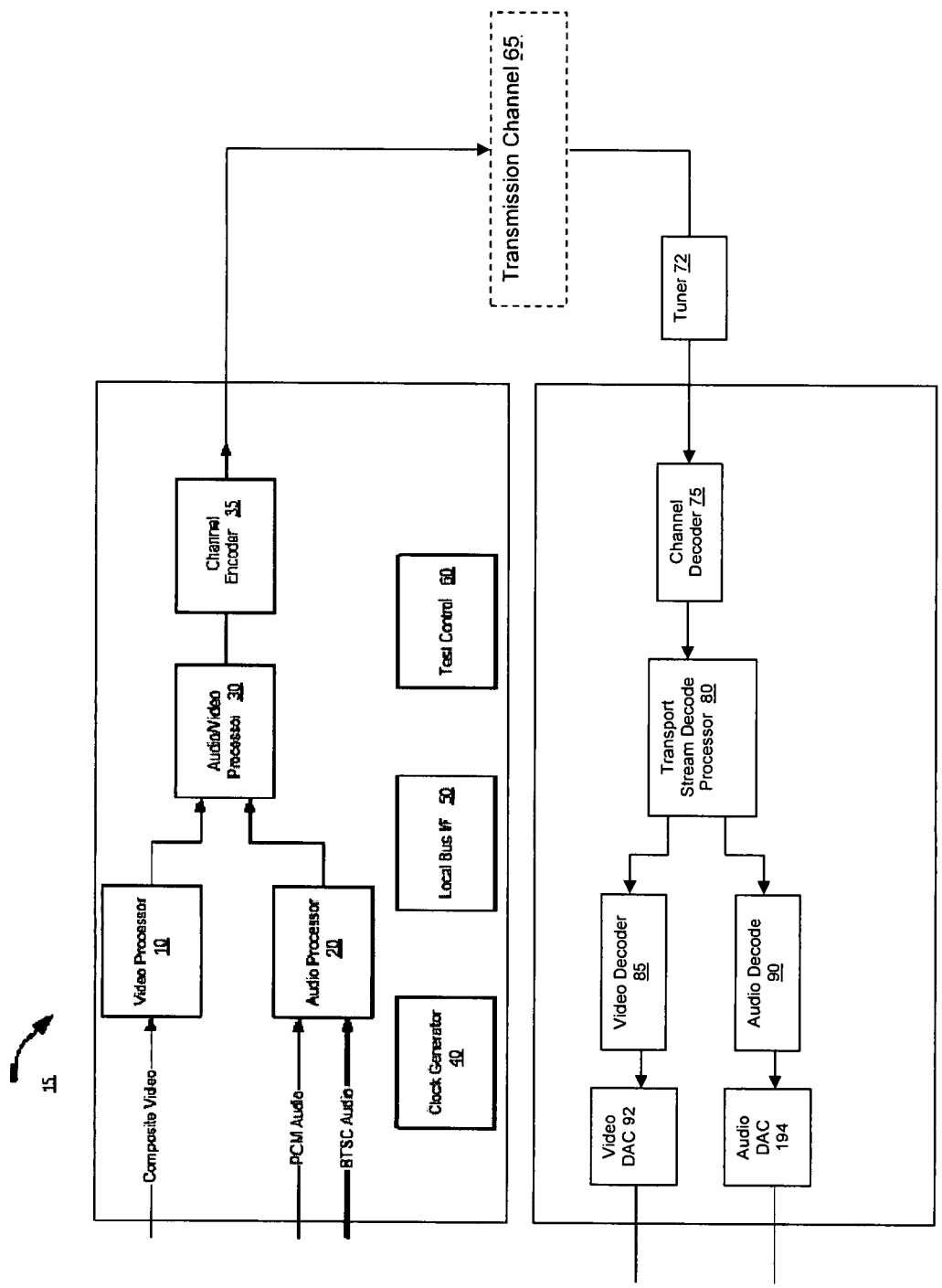
FIG. 1 is an overall block diagram illustrating a communications network.
Figure 2:
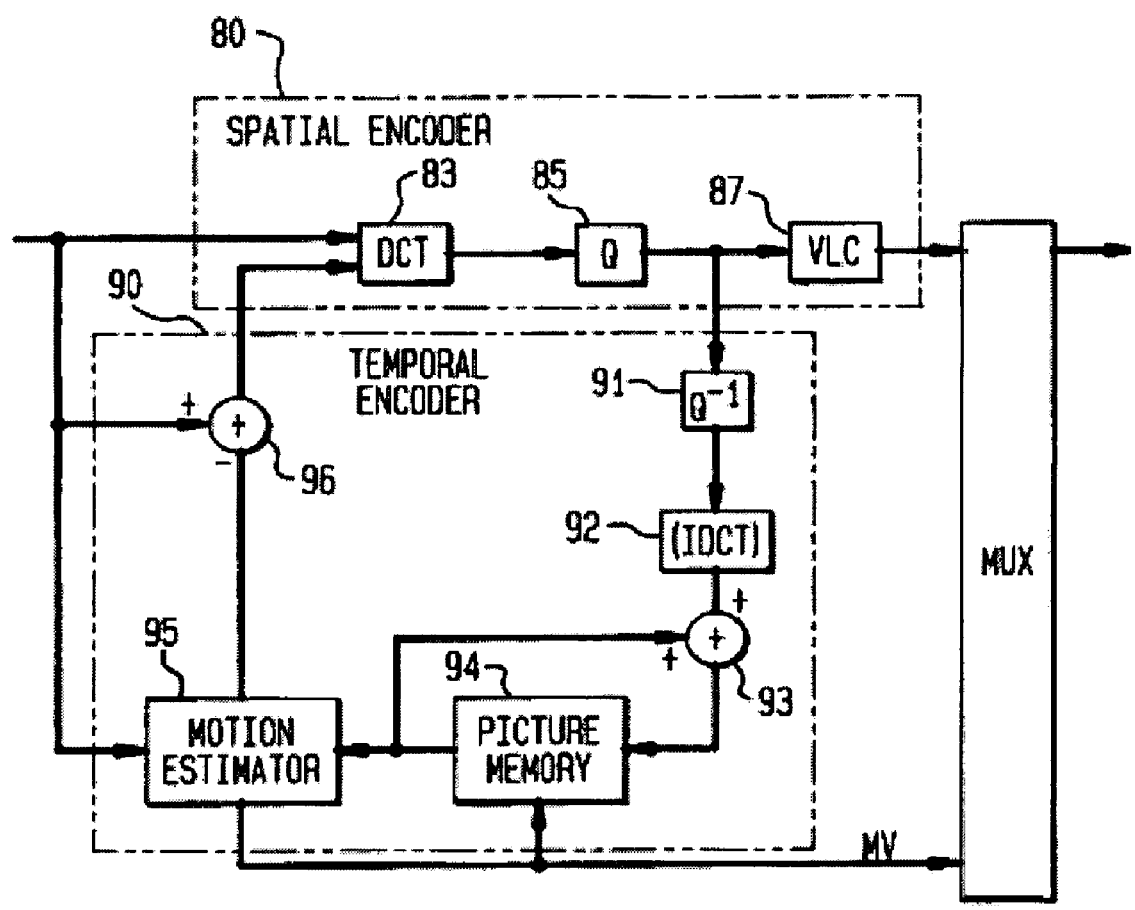
FIG. 2 depicts a video encoder.
Figure 3A:
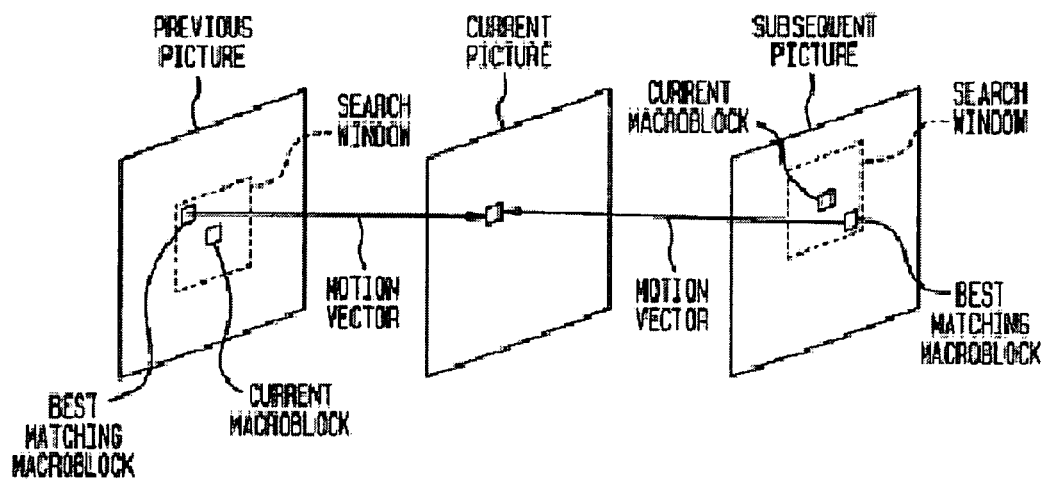
FIG. 3a illustrates motion estimation in the temporal encoder of the conventional video encoder of FIG. 2.
Figure 3B:
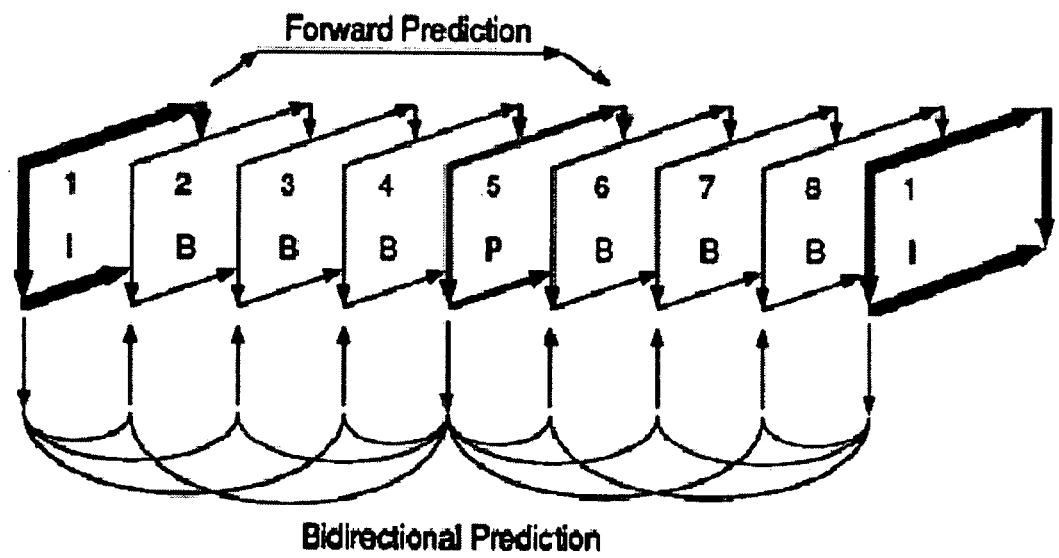
FIG. 3b illustrates the dependence of interceded pictures on anchor pictures used in forward and bidirectional prediction coding.
Figure 4:
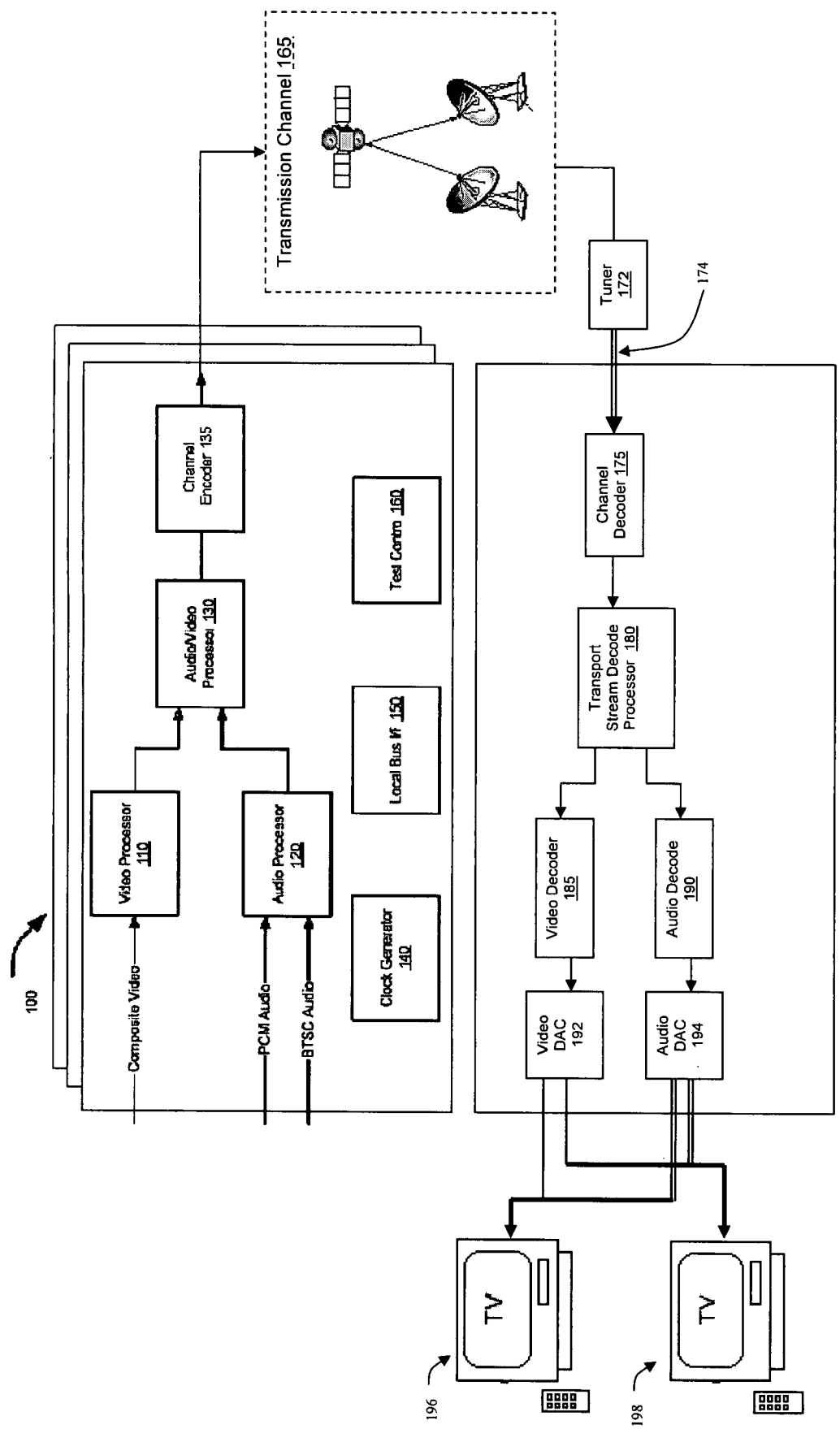
FIG. 4 depicts an overall block diagram illustrating a communications network in accordance with a selected embodiment of the present invention.

FIG. 4 illustrates a communication network where one or more encoders 100 transmit multiple signals 174 to a decoder 170 for servicing multiple output signals for simultaneous display on independent display devices 196, 198. As depicted, the present invention is capable of servicing multiple satellite channels. Specifically, it can receive at least two satellite input signals and produce two television output signals. Both of the output signals may be digitally based. The output signals can be displayed on two separate displays 196, 198, or can be displayed together on a single display in a "picture in a picture" mode.

As described below, support for multiple video channels is provided in the transport block 180, the audio decode block 190, the video decoder block 185 and the video digital-to-analog converter block 192. Additional support for two channel decoding and display may be provided in any the graphics block for the video signal (not shown) and the NTSC/PAL/SECAM video encoder block (not shown), and the audio DAC block also supports two audio channels.

In an integrated circuit embodiment of the present invention, decoding system 170 may receive signals 174 from two separate satellite inputs. Alternatively, the integrated circuit may receive multiple channels or programming from a single satellite input. The video and audio decoding components of the integrated circuit (including the transport and audio/video decoding processors and the DACs) operate to service these two channels under control of independently generated clock signals that and each synchronized to the respective program clocks of the channels being decoded.

Figure 5:
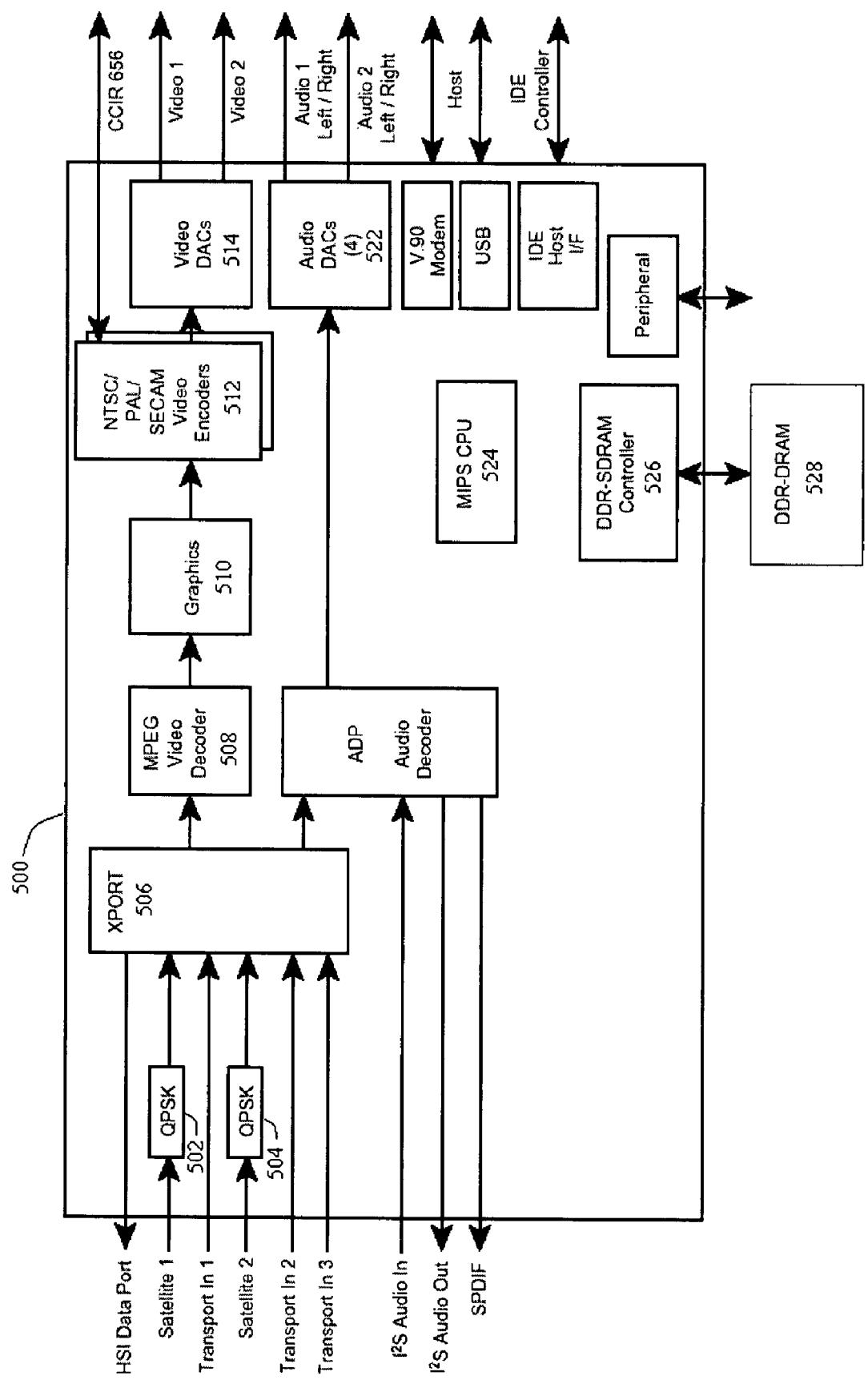
FIG. 5 is a diagram illustrating an embodiment of single chip set top box with dual channel processing and display according to the present invention.

In accordance with the present invention, FIG. 5 illustrates an embodiment of a single chip set-top box system for simultaneously processing and displaying two channels. As shown in FIG. 5, the set-top box system 500 includes integrated all digital receivers 502, 504, for demodulating transport streams, such as satellite signals. Each receiver (e.g., 502) receives a modulated data stream (e.g., Satellite 1) and delivers a demodulated, error corrected output data stream to the data transport processor 506.

Transport processor 506 is capable of simultaneously processing multiple independent transport streams. These transport streams can be selected from three external serial transport stream inputs (shown in FIG. 5 as Transport In 1, Transport In 2, and Transport In 3), from two on-chip receiver channels (output from receivers 502 and 504) or from internal playback channels. The simultaneous processing of five independent transport streams allows MPEG and DirecTV transport streams to be processed concurrently within the transport processor 506. As described herein, transport processor 506 is a transport stream message/PES parser and demultiplexer. In addition, the transport processor 506 supports decryption for up to 64 PIDs in the five streams. All 64 PIDs can be used for output to the video decoder 508 and audio decoder 520, as well as for output to external memory for local recording in memory 528. In addition to supporting multiple independent record and playback channels, the transport processor 506 also provides two PCR recovery blocks for synchronizing the audio/video decode and playback for simultaneous display on multiple independent display devices.

The encoded video stream provided by transport processor 506 is decoded by MPEG video decoder 508. In accordance with the present invention, decoder 508 can simultaneously decode two video streams, whether provided as transport, PES or ES streams. The streams are run-length decoded, inverse quantized and inverse transformed, and then rendered in 4:2:2 video format to provide primary and secondary video feeds.

The encoded audio stream provided by transport processor 506 is decoded by dual MPEG audio decoder 520, which processes up to three audio streams to provide synchronization and filtering. MPEG audio decoder 520 converts the compressed audio data to uncompressed PCM audio data. In a selected embodiment, the uncompressed PCM audio data can be mixed with other PCM audio data stored in memory 528. The final audio data is output through multiple audio DACs 522 to provide left and right audio signals for multiple programs.

As mentioned above, the audio/video decoders 508, 520 may provide decoded data to external memory 528, such as a 32-bit DDR-SDRAM memory subsystem 528. While improvements to memory fabrication technologies have resulted in denser memory chips, memory chip bandwidth has not been increasing as rapidly. The bandwidth of a memory chip is a measure of how fast contents of the memory chip can be accessed for reading or writing. As a result of increased memory density without necessarily a commensurate increase in bandwidth, in many conventional system designs multiple memory devices are used for different functions, and memory space in some memory modules may go unused or is wasted. Accordingly, a unified memory architecture may advantageously be used in connection with the present invention. In the unified memory architecture, all the tasks (also referred to as "clients"), including CPU, display engine and I/O devices, share the same memory. The unified memory architecture preferably includes a memory that is shared by a plurality of devices, and a memory request arbiter coupled to the memory, wherein the memory request arbiter performs real time scheduling of memory requests from different devices having different priorities. The unified memory system assures real time scheduling of tasks, some of which do not inherently have pre-determined periodic behavior and provides access to memory by requesters that are sensitive to latency and do not have determinable periodic behavior. The present invention may be implemented in connection with a unified memory architecture, such as described in U.S. Pat. No. 6,501,480, which is hereby incorporated by reference.

As depicted in FIG. 5, unified memory 528 and an associated memory controller 526 service an integrated circuit that receives, decodes and outputs multiple channels in a satellite signal. A single memory is advantageously used for the storage of video and audio information from the multiple channels by having the memory controller 526 properly reference the video images from the two or more channels. In addition, controller 526 may include and a 16-bit DDR interface option for lower end applications. In accordance with the present invention, multiple decoded video and audio streams may be simultaneously stored in memory 528 or played back from memory 528.

In a single chip integrated circuit embodiment of the present invention for decoding and displaying multiple satellite signals, dual digital satellite receivers 502, 504 accept two modulated data streams (e.g., "Satellite 1" and "Satellite 2") at up to 90 Mbps. Each integrated receiver (e.g., 502) delivers demodulated, error-corrected output data streams to the transport processor 506. In one embodiment, each receiver (e.g., 502) includes accepts analog baseband I and Q input signals, samples these signals with dual A/D converters, digitally mixes the sampled signals with a variable rate BPSK/QPSK/offset QPSK receiver, and then performs error correction to generate the output signal in transport format.

The data transport processor 506 receives and processes multiple transport streams to parse the message and PES information and to demultiplex the audio and video streams that are provided the video decoder 508 and audio decoder 520. In accordance with an embodiment of the present invention which simultaneously processes two transport streams, transport processor 506 can simultaneously process 64 PIDs in up to five independent transport streams, with decryption for all 64 PIDs. In addition, transport processor 506 supports message/PES parsing for 64 PIDs with storage to 64 external DRAM buffers, and provides 64 section filters. The transport processor 506 also supports personal video recording using three record channels and four playback channels, and further provides a high-speed transport output or a two-channel remux output.

The MPEG video decoder 508 performs MPEG video decoding on two video streams which may be accepted from transport streams, PES streams or ES streams. After performing MPEG decoding functions, decoded video is rendered and provided as an output to graphics engine 510 in 4:2:2 format. The graphics engine 510 accepts dual decoded MPEG video data and performs professional quality compositing of text and graphics with video. The resulting signal is provided to a video display engine consisting of NTSC/PAL/SECAM video encoder 512 and video DAC 514. The video display engine generates dual video output signals for display on two televisions displays 196, 198.

Satellite Receivers

Figure 6:
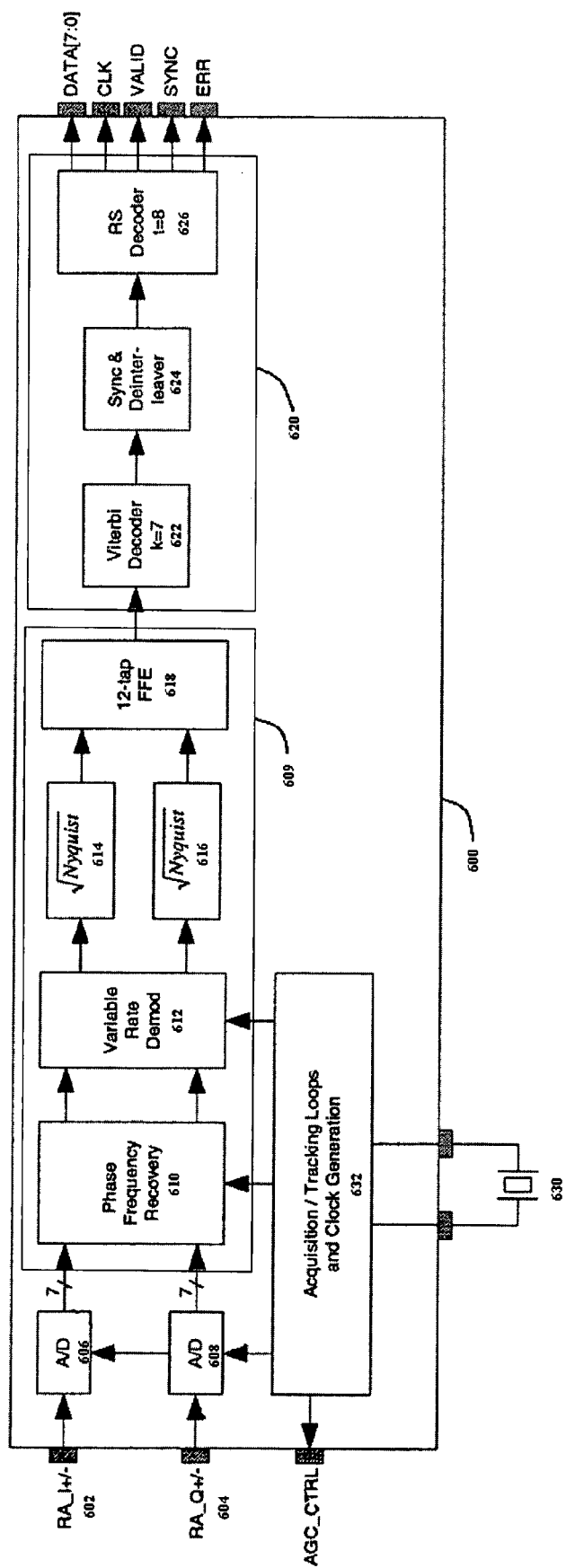
FIG. 6 is a functional block diagram of a receiver for demodulating and converting transmitted signals into a digital data stream.

FIG. 6 illustrates an embodiment of the receivers 502, 504 depicted in FIG. 5, where receiver 600 demodulates and converts transmitted signals into a digital data stream that is provided to transport processor 506. As shown, each integrated receiver accepts a modulated data stream 602, 604. In a selected embodiment, the modulated datastream is serial satellite data delivered at up to 90 Mbps. The receiver 600 delivers a demodulated, error-corrected output data stream (DATA[7:0]).

Each integrated receiver 600 includes an analog front end for digitizing the input signals, such as "Satellite 1" shown in FIG. 5. In one embodiment, dual 7-bit A/D converters 606, 608 accept analog baseband I and Q input signals, and sample these signals to produce 7-bit digital I and Q data with zero DC bias.

The output from the analog front end is provided to demodulator 609. As illustrated in FIG. 6, demodulator 609 includes phase/frequency recovery circuit module 610, dual variable rate digital filters 612, dual square root Nyquist matched filters 614, 616, and an equalizer 618. The phase/frequency recovery module 610 removes residual phase and frequency offsets in the baseband signal of up to ±15 MHz. In addition, phase/frequency recovery circuit module 610 tracks changes in frequency and phase due to local oscillator drift in the tuner and LNB. The variable rate digital filters 612 in receiver 600 operate under the control of the symbol timing recovery loop to re-sample the input data at the correct frequency and phase to ensure that ideally sampled symbols are input to the matched filters 614, 616. These filters 614, 616 consist of dual square root Nyquist filters. In a selected embodiment, the matched filters have a programmable 20% or 35% excess bandwidth factor. Receiver 600 also includes an equalizer 618 for improving the effective received signal to noise ratio. In a selected embodiment, the equalizer 618 is an 8-tap or 12-tap linear transversal equalizer which removes correlated noise from the signal.

The timing for the analog front end 606, 608 and demodulator 609 is provided by clock generator 632. As illustrated in FIG. 6 and described more fully below, an off-chip crystal oscillator 630 is used as a reference to generate required clock frequencies for the receiver 600. Whether generated as part of the circuitry for receiver 600 or elsewhere within circuitry for decoding system 500, the clock generation unit 632 receives PCR values extracted from the transport stream which are used to synchronize the system clock with the program clock. In accordance with a selected embodiment, a single, fixed, 27 MHz external reference crystal oscillator 603 is used to drive a PLL circuit which synthesizes an adjustable system clock in response to control words provided directly from PCR recovery circuit. In this embodiment, an additional PLL circuit generates the other frequencies required by the system. With this embodiment, an external voltage controlled crystal oscillator ("VCXO") is not required for the receiver. As a result, all required clocks are generated on chip from a single reference crystal.

In an alternate embodiment, a VCXO-based clock generator is used to generate the required system clocks so that a VCXO would be required for each receiver 502, 504. Such a clock could be the only clock generator, or could be a backup clock source for the PLL-based clock circuit described above. In this embodiment, the external VCXO is controlled by the gain control signal AGC_CTRL generated by the clock generation circuit 632.

The output from modulator 609 is provided to an FEC decoder 620 for error correction. In a selected embodiment, the FEC decoder 620 complies with the DVB, DirecTV, and Digicipher II error correction and framing schemes for satellite transmissions. As shown in FIG. 6, FEC decoder 620 includes a Viterbi decoder 622. In addition, frame synchronization and convolutional de-interleaving are provided by synchronizer and deinterleave unit 624. Reed-Solomon (RS) error correction and de-randomization is then provided with RS decoder 626, which generates the output data for receiver 600. For example, the final error-corrected output is delivered in MPEG-2 or DirecTV transport format.

Transport Processor

Figure 7:
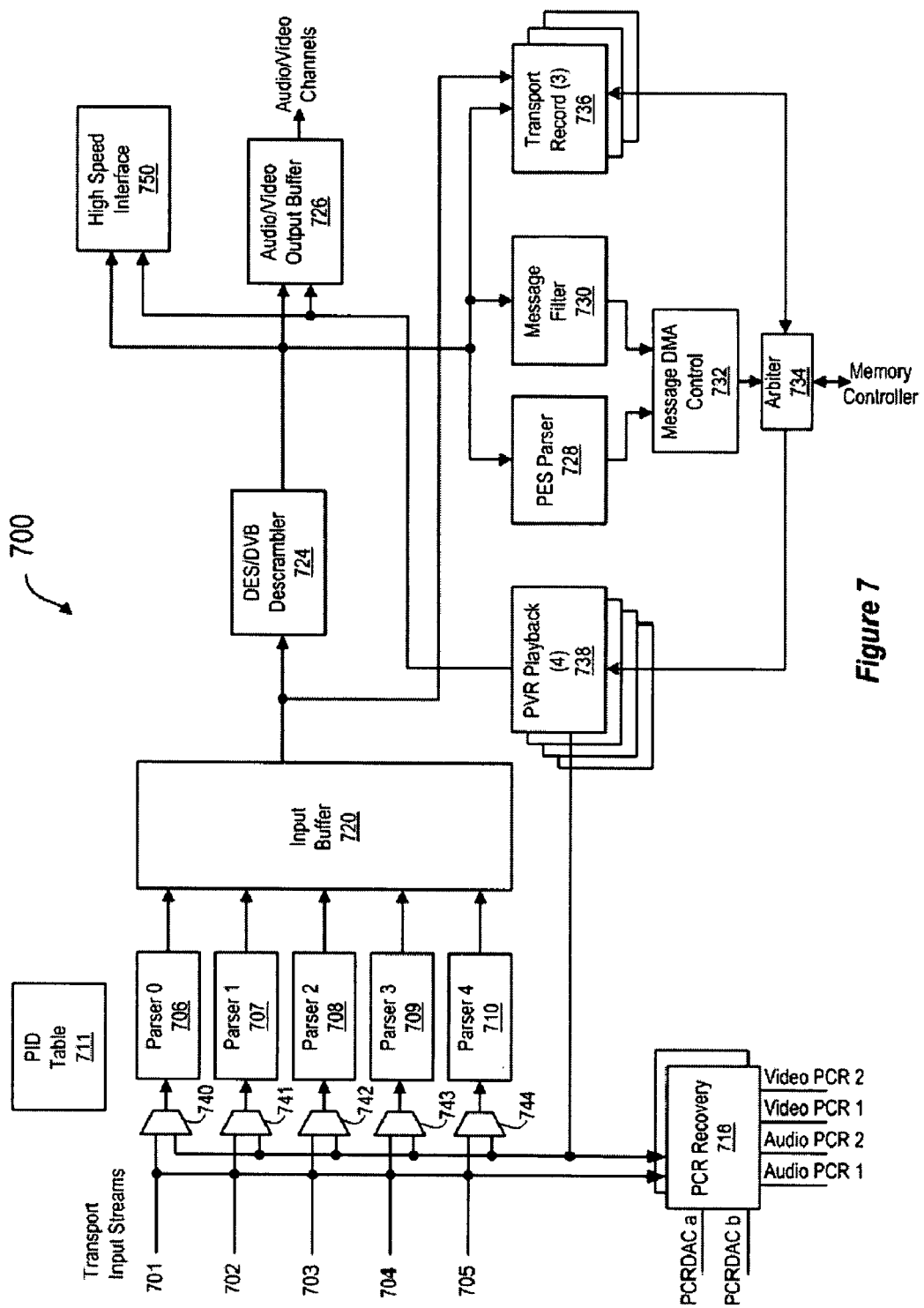
FIG. 7 illustrates an embodiment of the transport processor for demultiplexing multiple input signals

As shown in FIG. 5, the output from the receivers 502, 504 is provided to the data transport processor 506. FIG. 7 illustrates an embodiment of the transport processor 506 depicted in FIG. 5, where transport processor 700 extracts control data from the transport stream and provides encoded video and audio streams to video decoder and audio decoder. The transport processor 700 extracts and decrypts the MPEG-2 video data for example, Dolby Digital audio data for example, and PCR from the input in-band transport stream. Transport processor 700 also extracts PSI and generic PES data from the input in-band or out-of-band data stream. The transport processor 700 capable of demultiplexing 64 data PIDs from the in-band or out-of-band data stream, for example, and supports 64 section filters.

In a selected embodiment, integrated transport processor 700 is an MPEG-2/DirecTV transport stream message/PES parser and demultiplexer. As shown in FIG. 7, transport processor 700 processes up to five independent transport streams 701-705 simultaneously using the five available parsers 706-710. In a selected embodiment, the input transport streams are selected from three external serial transport stream inputs (e.g., "Transport In 1" in FIG. 5), two on-chip satellite receiver channels (e.g., "Satellite 1" in FIG. 5), and four internal playback channels (from playback module 738). As illustrated, all 64 PIDs can be used for output to the audio decode processor 520, video decode processor 508, PVR playback unit 738 or for output via the high-speed transport or remux module 750.

The transport processor 700 includes a DVB and DES descrambler 724. The DVB engine supports full and conformance modes. The DES engine supports electronic code book and cipher block chaining modes with selectable residue termination modes of partial block unscrambled, residual block termination, and cipher-text stealing. DVB and DES descrambler 724 is used for conditional access control.

After descrambling, PES parser 728 and message filter 730 provide message or generic PES processing and storage in up to 64 external DRAM message buffers for up to 64 PIDs. In a selected embodiment, message filter 730 is a 64 section filter for processing of MPEG/DVB sections or DirecTV messages.

As shown in FIG. 7, transport processor 700 supports three independent record channels for recording of up to 64 PIDs through transport recorder 736. The transport recorder 736 stores transport packets through the memory controller 526.

In addition, transport processor 700 provides four independent playback channels for playback of pre-recorded streams through playback circuit 738. The playback circuit or PVR 738 may operate in either MPEG mode or DirecTV mode for example. The PVR 738 may perform a DMA function of transferring data from the external memory 528 into the transport processor 700 via arbiter 734. During the playback mode, the PVR 738 receives the stored transport packets from the external memory and provides these packets to the audio/video output buffer 726, the high speed interface 750, the PCR recovery module 716 and the multiplexers 740-744. During this mode, the multiplexers 740-744 provide the stored transport packets to the parsers 706-710.

The data transport processor 700 also provides PCR recovery unit 716, which extracts multiple program clock values (alternatively referred to as "PCRs") from the transport input streams that are used for processing of multiple channels. The PCR recovery unit 716 extracts PCRs from transport streams having different formats, including but not limited to MPEG Transport streams and DirecTV transport streams. The PCR recovery unit 716 provides different types of outputs, including serial PCR values (e.g., Audio PCR 1 and Video PCR 1) for each audio and video channel being displayed. As described herein, the PCR extracted from the transport stream for each stream being processed is used to lock the local clock to the program clock. In this manner, the decoder and encoder clocks for each stream being processed are synchronized. In a selected embodiment, the extracted PCR values are used to drive PCR control words for controlling the integrated PLL clock circuit described herein. In another embodiment, the extracted PCR value is used by an integrated dual phase lock loop clock generator to synthesize the 27 megahertz system clock and other clock signals required by the system for synchronizing with the program clock.

In the alternative or in addition, PCR recovery unit 716 provides an output signal PCRDAC to a digital-to-analog converter ("DAC"), again for each audio and video channel being displayed. The PCRDAC output is used to derive pulse width modulated analog signals that are provided to a voltage control crystal oscillator ("VCXO") to adjust the voltage level to control the VCXO frequency, which in turn adjusts the system clock to lock to the program clock. In still other embodiments, the DAC may be included in one of the downstream devices such as the video transport.

MPEG Video Decoder

Figure 8:
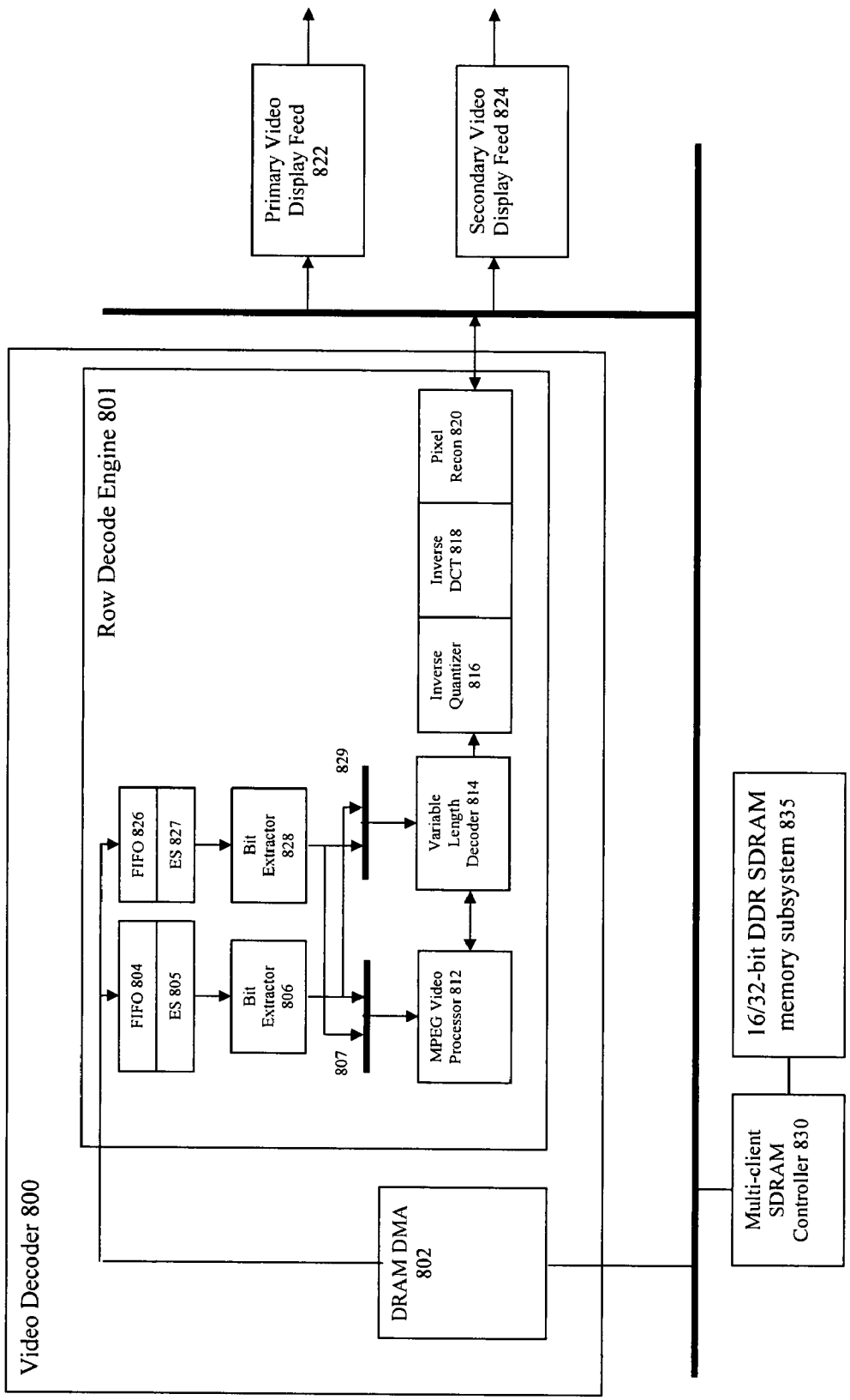
FIG. 8 illustrates a video decoding processor for decompressing multiple encoded digital video signals.

As shown in FIG. 5, the output from the transport processor 506 is provided to the video decoder 508. FIG. 8 illustrates an embodiment of the video decoder processor 508 depicted in FIG. 5, where video decoder processor 800 performs MPEG video decoding on up to two video streams, and provides decoded video data to the graphics engine 510. In a selected embodiment, the video decoder 800 is an MPEG-2 decoder for decoding two video streams, operating at 81 MHz. The MPEG decoder can optionally accept transport (ATSC-MPEG/DirecTV), PES or ES streams and self-sufficiently performs all the requisite decoding functions, and renders the decoded video, in 4:2:2 format.

For example, video decoder 800 receives a first encoded video stream for a first channel to be decoded from 16/32-bit DDR SDRAM memory subsystem 835 that is configured to work as a unified memory architecture. Alternatively, the encoded video stream is provided by transport processor 506. However provided, the video stream is introduced to the row decode engine 801 through direct memory access controller 802. A first encoded video signal is initially stored in buffer 804 so that elementary stream data may be removed by bit extractor 806 and applied to multiplexers 807 and 829. Under control of the MPEG video processor 812, the first encoded video stream is Huffman decoded and run length decoded with variable length decoder 814. Inverse quantizer 816 performs dequantization on the data, which is then inverse transformed by IDCT 818. Any required pixel reconstruction is provided by pixel reconstruction unit 829, and the decoded video data is then output from the row decode engine 801. Primary video display feed 822 is used to render the decoded video from 4:2:0 into 4:2:2 format, which is then available as an HD/SD video feed for a first display device, such as a first television.

In accordance with the present invention, video decoder 800 can decode a second encoded video stream for a second channel simultaneously with the decoding of the first encoded video stream. In this case, the second encoded video signal is initially stored in buffer 827 so that elementary stream data may be removed by bit extractor 828 and applied to multiplexers 807 and 829. Under control of the MPEG video processor 812, the second encoded video stream is variable length decoded (814), inverse quantized (816) and inverse DCT transformed (818) before any required pixel reconstruction is performed (820). The second decoded video data is then output from the row decode engine 801, and secondary video display feed 824 is used to render the decoded video from 4:2:0 into 4:2:2 format, which is then available as a secondary SD video feed for a second display device, such as a first television, or a picture-in-picture ("PIP") video feed.

Display Engine

Figure 9:
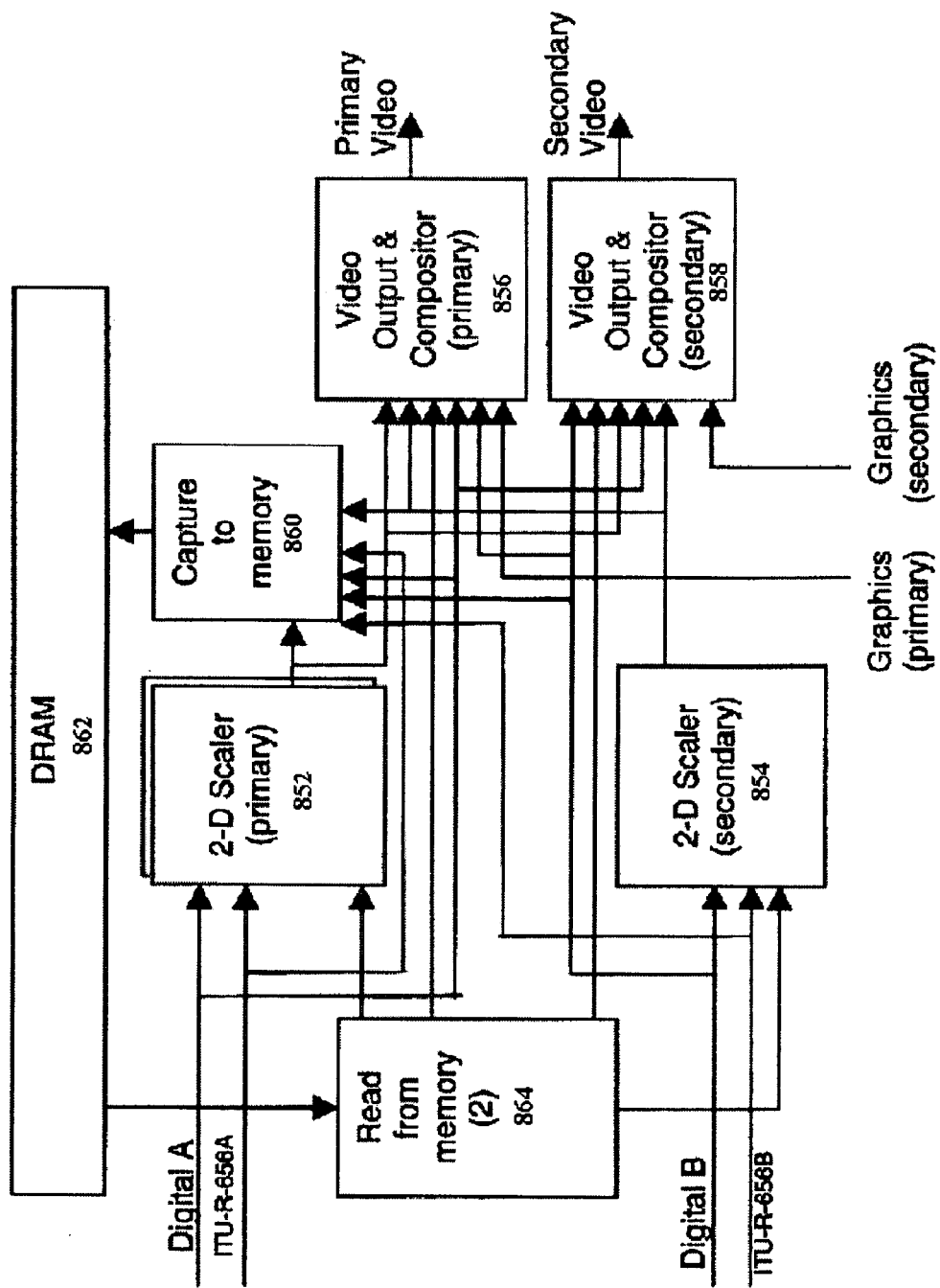
FIG. 9 is a top level depiction of a display engine for generating primary and secondary video signals.

The decoding system depicted in FIG. 5 also includes a graphics and video display engine which includes graphics unit 510 and video encoders 512. As illustrated in FIG. 9, this display engine 850 takes in uncompressed video from the digital video decoder 508 (Digital A or Digital B) or from the ITU-R-656 Input (ITU-R-656A or ITU-R-656B). In both cases, the format is $YC_RC_B$ 4:2:2. Through the graphics and video display engine 850, the video can be scaled in horizontal and vertical directions (2-D Scaler 852 or 2-D Scaler 854). The video can be displayed immediately (in-line) through the video output and compositor units (856 or 858). Alternatively, it can be captured (860) to memory (862) and displayed from memory. Scaling is optional and may not need to be performed for normal display of digital or analog video.

As illustrated in FIG. 9, there are two scalers (852, 854), two capture paths (860), two paths to display video from memory 864 (called video windows), and two video output paths (856, 858). In addition, primary and secondary graphics input are provided for input to the video output and compositor units. In one embodiment, the graphics engine 510 pipelines multiple graphics streams when multiple channels are simultaneously decoded and displayed by the decoding system 500. As shown in FIG. 9, each of the scaler, capture and output blocks has the ability to select from various inputs.

In accordance with the present invention, each display path (primary and secondary) has its own time base capability, with independent clocks. These independent clocks may be provided by two 27 MHz VCXO-based clock circuits where each of the DACs are driven using one of the two 27 MHz VCXO clocks. Alternatively, the independent clocks may be provided by the integrated PLL clock circuit with phase rotators described herein. In both cases, the associated 27 MHz clock can be phase locked to the PCRs from an MPEG transport stream input. Each of the two video outputs from the MPEG decoder 508 to the graphics engine 510 is driven with the clock that is associated with the video output path that it is supplying.

Composite Video Encoder (VEC)

As illustrated in FIG. 5, two composite video encoders (VECs) 512 are provided, one for the primary video output and one of the secondary output. Each VEC takes in $YC_RC_B$ (601) video and produces both composite (NTSC or PAL) video and the associated Y/C format. The composite (CVBS) and Y/C signals are sent to on-chip video DACs 514 that produce analog outputs.

Video DACs

DAC unit 514 includes four video DACs to allow for a full component output (4 outputs) along with a Composite or S-Video secondary channel. Because the present invention supports multiple outputs on a single integrated circuit system, the pinout to separately service each of these outputs would be extremely large. To overcome this problem, audio and video DACs 522, 514 may be implemented as a configurable DAC bank which is employed to service the multiple video outputs.

Dual Audio Decoder

Figure 10:
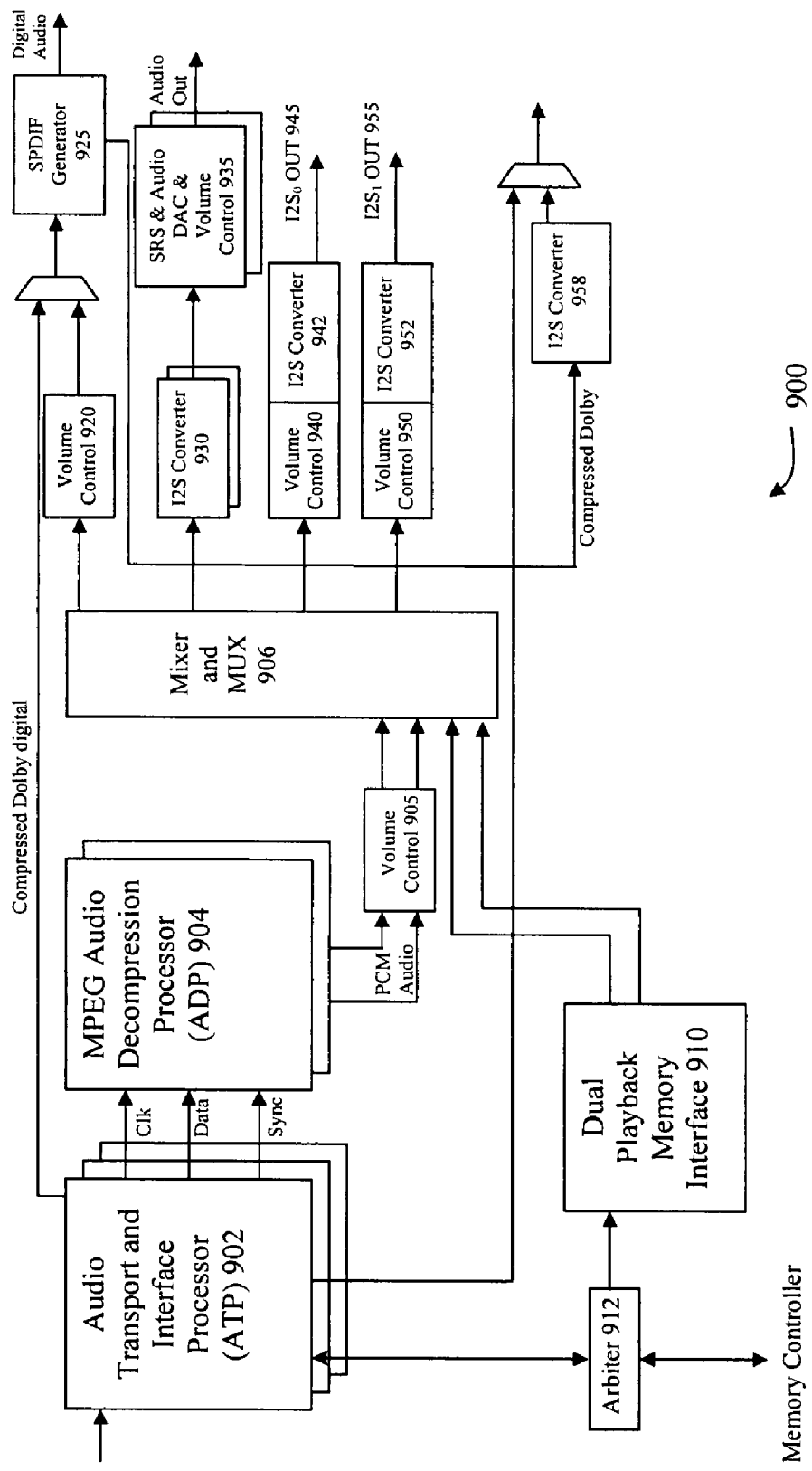
FIG. 10 shows an overall block diagram of a dual audio decoder.

As also shown in FIG. 5, the output from the transport processor 506 is provided to the audio decoder 520. FIG. 10 illustrates an embodiment of the audio decoder processor 900 that performs audio decoding on up to two audio streams, and provides decoded audio data to the audio DACs 522. In a selected embodiment, the audio decoder 900 is an MPEG-2 decoder for decoding Layer 1 and Layer 2 audio. The audio decoder 900 is implemented as several discrete processing functions. Data is first processed by up to three of the audio transport and interface processors 902 which handle synchronization and filtering functions. Next, data is sent to up to two of the MPEG audio decompression processors 904 for conversion from compressed audio data to uncompressed PCM audio data. Alternatively, the data output from ATP 902 may be sent to an external Dolby Digital, MPEG or AAC audio decompression processor. At mixer 906, the PCM audio data output from ADP 904 can be mixed with PCM audio from the Playback Memory Interface 910. The final mixed audio can be output as digital audio over an SPDIF interface 925. Alternatively, it may be output in analog mode through a two-channel audio DAC 935, or output via the I2S port from 945, 955. Additionally, the output of one of the ATPs 902 can send compressed Dolby data to the SPDIF module 925 to be output on the SPDIF interface simultaneously with decompressed MPEG being output on either of the two DAC outputs 935.

Clock Generator

Figure 11:
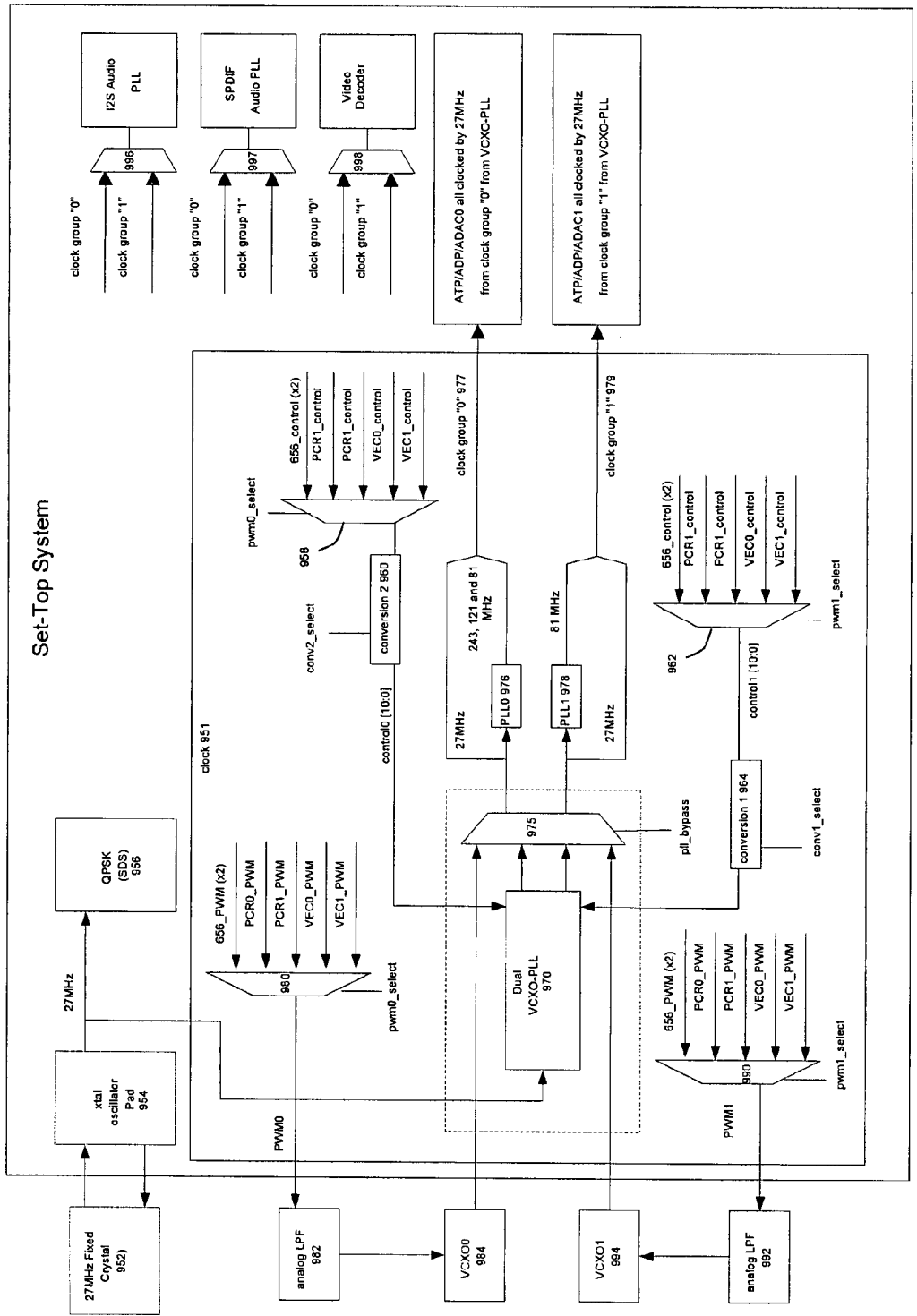
FIG. 11 depicts a system diagram of a clock generator circuit for generating multiple clocks using internal phase lock loop circuits to generate multiple system clocks.

As described above, multiple programs are serviced by an integrated circuit system and method by generating and distributing corresponding time domain clocks to the various components of the integrated circuit. FIG. 11 illustrates selected embodiments of a clock generator aspect of the present invention, where clock 951 receives control signals derived from the PCR values extracted by transport processor 506 from the transport stream and provides multiple independent clock groups to the system components that decode the encoded video and audio streams.

As illustrated in FIG. 11, an integrated circuit system 950 includes a clock generator 951 for generating and distributing corresponding time domain clocks 977, 979 to the various components of the integrated circuit. In accordance with a first embodiment depicted in FIG. 7, the transport block 700 that receives one or more satellite signals from a demodulating block will produce a voltage-based error signal (e.g., PCR0_PWM) that serves as an input to clock circuit 951 at multiplexer 980. Additional correction signals may also be generated and provided to clock circuit 951 by other system components, such as a control signal (VEC0_PWM) from video encoder unit 512 or CCIR 656 control words. Under control of a clock selection signal (pwm0_select) input to multiplexer 980, an error signal is selected and may optionally be applied to an analog low pass filter 982 before being presented to an external voltage controlled crystal oscillator 984 to adjust the frequency of its clock signal output. Bypass multiplexer 975, under control of the select signal (pll_bypass), may select the signal from VCXO 984 for application to a second set of PLLs (PLL0 976 and PLL1 978) which generate the other frequencies required by the system (81 MHz, 243 MHz, 121.5 MHz).

While the foregoing circuit is used to generate a first set of clock signals that are synchronized to a program clock for a first channel to be displayed, in accordance with the disclosed embodiment, a second set of clock signals that are synchronized to a program clock for a second channel to be displayed may simultaneously be generated. As shown in FIG. 11, clock generator 951 includes additional circuitry for generating and distributing a second set of time domain clocks. In particular, voltage-based error signals (e.g., PCR1_PWM, VEC1_PWM) are also provided as input(s) to clock circuit 951 at multiplexer 990. Under control of a clock selection signal (pwm1_select) input to multiplexer 990, an error signal is selected and may optionally be applied to an analog low pass filter 992 before being presented to an external voltage controlled crystal oscillator 994 to adjust the frequency of its clock signal output. Bypass multiplexer 975, under control of the select signal (pll_bypass), may select the signal from VCXO 994 for application to a second set of PLLs (PLL0 976 and PLL1 978) which generate the other frequencies required by the system (81 MHz, 243 MHz, 121.5 MHz).

FIG. 11 also illustrates an alternate embodiment of the clock generator aspect of the present invention which replaces the external VCXO(s) with an internal PLL circuit 970. In accordance with this alternate embodiment depicted in FIG. 7, the transport block 700 provides control words (e.g., PCR1_control) that are derived from the extracted PCR values. These control words are provided as an input to clock circuit 951 at multiplexer 958. Additional control words may also be generated and provided to clock circuit 951 by other system components, such as a control word (VEC0_control) from video encoder unit 512 or CCIR 656 control words. Under control of a clock selection signal (pwm0_select) input to multiplexer 958, a control word is selected, converted from serial to parallel at converter 960 and presented to a dual VCXO-PLL circuit 970 to adjust the frequency of its clock signal output. Under control of the select signal (pll_bypass), bypass multiplexer 975 selects from the signals generated by VCXO-PLL circuit 970 for application to a second set of PLLs (PLL0 976 and PLL1 978) which generate the other frequencies required by the system (81 MHz, 243 MHz, 121.5 MHz). In a selected embodiment, bypass multiplexer 975 selects from the signals generated by VCXO-PLL circuit 970, the VCXO 984 and/or the VCXO 994. In yet a further embodiment, VCXO-PLL circuit 970 may include the bypass multiplexer functionality of bypass multiplexer 975. In accordance with the alternate disclosed embodiment, a second set of clock signals that are synchronized to a program clock for a second channel to be displayed may simultaneously be generated. As shown in FIG. 11, clock generator 951 includes additional circuitry for generating and distributing a second set of time domain clocks. In particular, PCR-based control words (e.g., PCR1_control, VEC1_control) are also provided as input(s) to clock circuit 951 at multiplexer 962. Under control of a clock selection signal (pwm1_select) input to multiplexer 962, an control word is selected, converted and applied to VCXO-PLL circuit 970 to adjust the frequency of its clock signal output. Bypass multiplexer 975, under control of the select signal (pll_bypass), may select the signal from VCXO-PLL circuit 970 for application to a second set of PLLs (PLL0 976 and PLL1 978) which generate the other frequencies required by the system (81 MHz, 243 MHz, 121.5 MHz).

Multiple synthesized clocks referencing an input reference clock source may be generated in connection with the present invention by using a phase locked loop circuit coupled to a plurality of phase rotator circuits. In a selected embodiment, the dual VCXO-PLL circuit 970 includes a phase locked loop coupled to two phase rotators. The phase locked loop includes a phase detector, a charge pump coupled to the phase detector, a low pass filter coupled to the charge pump, an internal voltage controlled oscillator coupled to the charge pump and a divider coupled in feedback between the internal voltage controlled oscillator and the phase detector. It is intended that other types of PLL circuits could be implemented in accordance with the present invention.

The output of the internal voltage controlled oscillator is coupled to two or more phase rotators (also called "phase interpolators"). Each phase rotator consists of multiple digital-to-analog converters coupled together into a group according to clock phase sources, where each DAC group is controlled by a differential signal supplied to the group. Each phase rotator may be configured to assign a relative weighting of the signals from the PLL circuit to form a plurality of weighted signals. These weighted signals are combined to form an output signal, whereby the weighting determines an output phase of the output signal. By continuously rotating the output signal through 360 degrees, a frequency shift in the output of the phase rotator is introduced, where the amount of frequency shift is determined by the rotation speed of the phase rotator. Where multiple phase rotators are coupled to a PLL circuit, each phase rotator generates a plurality of phases from the phases generated by the PLL circuit.

The PLL clock generator circuits described herein can be implemented by the structures disclosed in the copending U.S. patent application entitled "Multiple Synthesized Clocks with Fractional PPM Control From A Single Clock Source," by S. Fallahi et al., Ser. No. 10/131,034, filed Apr. 1, 2002, and assigned to Broadcom Corporation, which is also the assignee of the present application. The above copending application Ser. No. 10/131,034, is hereby incorporated by reference in its entirety.

As described herein, multiple independent clock signals may be generated using external VCXOs controlled by PWM waveforms from each channel being processed. Alternatively, an internal PLL clock circuit is disclosed which eliminates the need for external VCXOs. In such an alternate embodiment, a single, fixed, 27 MHz external reference crystal oscillator may be used to drive the internal VCXO-PLL unit 970. As disclosed, a single VCXO-PLL unit 970 services both channels being decoded. The VCXO-PLL will synthesize the system clock for the chip, which can be independently adjusted by +/−244 ppm from the reference with an 11-bit digital control word. The control word inputs may be provided by the transport PCR recovery unit, the VEC units and/or the 656 inputs. In addition, a second set of PLLs (PLL0 976 and PLL1 978) generate the other frequencies required by the system (81 MHz, 243 MHz, 121.5 MHz.). In a selected embodiment, the 27 MHz clocks are provided as clock outputs directly from the VCXO-PLL to minimize jitter.

As illustrated in FIG. 11, the clock 951 outputs two groups of clocks. In a selected embodiment, clock group "0" 977 contains synchronous clocks at 243, 121.5, 81, and 27 MHz, while clock group "1" 979 contains synchronous clocks at 81 and 27 MHz. As will be appreciated, the generated clock groups 0 may, or may not, be synchronous with clock group 1. For example, when the two channels to be displayed are presented in "picture-in-a-picture" mode (PIP), the clock groups may be the same, synchronous, balanced clock. In this example, the bypass multiplexer 975 should route the output from VCXO0 984 to both clock group "0" 977 and clock group "1" 979 simultaneously.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A media processing system comprising:
   a transport processor operable to demultiplex multiple input transport streams to generate a first video stream corresponding to a first program signal and a second video stream corresponding to a second program signal and including Program Clock Recovery (PCR) circuitry operable to extract from the multiple input transport streams first PCR data corresponding to the first program signal and second PCR data corresponding to the second program signal, and
   clock circuitry operable to, based upon the first PCR data and the second PCR data, generate a first clock signal that is synchronized to a program clock for the first program signal and a second clock signal that is synchronized to a program clock for the second program signal.

2. The media processing system of claim 1, wherein:
   a first input transport stream of the multiple input transport streams is produced from programming stored on local storage; and
   a second input transport stream of the multiple input transport streams is received from an external source.

3. The media processing system of claim 1, wherein:
   a first input transport stream of the multiple input transport streams is received via a first wireless channel; and
   a second input transport stream of the multiple input transport streams is received via a second wireless channel.

4. The media processing system of claim 1, further comprising a plurality of receivers, each operable to receive a modulated data stream and to produce a respective input transport stream.

5. The media processing system of claim 1, wherein the clock circuitry comprises:
   first clock circuitry operable to generate a first system clock corresponding to the first program signal based upon the first PCR data and operable to generate a second system clock corresponding to the second program signal based upon the second PCR data, the first clock circuitry comprising:
   a phase detector;
   a voltage controlled oscillator;
   a divider coupled between an output of the voltage controlled oscillator and an input of the phase detector; and
   a plurality of phase rotators coupled to the output of the voltage controlled oscillator, each phase rotator generating a plurality of phases; and
   second clock circuitry having phase locked loop circuitry operable to generate additional frequencies required by the media processing system for decoding and displaying the first and second program signals.

6. The media processing system of claim 1, further comprising a video decoder coupled to receive the first and second clock signals from the clock circuitry such that the video decoder may simultaneously decode first and second video streams extracted from the first and second program signals.

7. The media processing system of claim 6, further comprising a graphics processor operable to process video data produced by the video decoder.

8. The media processing system of claim 7, further comprising a video encoder operable to encode the output of the graphics processor.

9. The media processing system of claim 1, wherein the clock circuitry comprises:
   a first phase locked loop coupled to a first plurality of phase rotators for generating a first plurality of clock signals for use in decoding the first program signal, and
   a second phase locked loop coupled to a second plurality of phase rotators for generating a second plurality of clock signals for use in decoding the second program signal.

10. The media processing system of claim 1, wherein the transport processor and the clock circuitry reside on a common substrate.

11. A media processing system of a wirelessly enabled device, the media processing system comprising:
    at least one wireless receiver operable to receive a plurality of modulated data streams and to produce multiple input transport streams;
    a transport processor operable to demultiplex multiple input transport streams to generate a first video stream corresponding to a first program signal and a second video stream corresponding to a second program signal and including Program Clock Recovery (PCR) circuitry operable to extract from the multiple input transport streams first PCR data corresponding to the first program signal and second PCR data corresponding to the second program signal, and
    clock circuitry operable to, based upon the first PCR data and the second PCR data, generate a first clock signal that is synchronized to a program clock for the first program signal and a second clock signal that is synchronized to a program clock for the second program signal.

12. The media processing system of claim 11, wherein
    a first input transport stream of the multiple input transport streams is received via a first wireless channel; and
    a second input transport stream of the multiple input transport streams is received via a second wireless channel.

13. The media processing system of claim 11, wherein the clock circuitry comprises:
first clock circuitry operable to generate a first system clock corresponding to the first program signal based upon the first PCR data and operable to generate a second system clock corresponding to the second program signal based upon the second PCR data, the first clock circuitry comprising:
a phase detector;
a voltage controlled oscillator;
a divider coupled between an output of the voltage controlled oscillator and an input of the phase detector; and
a plurality of phase rotators coupled to the output of the voltage controlled oscillator, each phase rotator generating a plurality of phases; and
second clock circuitry having phase locked loop circuitry operable to generate additional frequencies required by the media processing system for decoding and displaying the first and second program signals.

14. The media processing system of claim 13, further comprising a video decoder coupled to receive the first and second clock signals from the clock circuitry such that the video decoder may simultaneously decode first and second video streams extracted from the first and second program signals.

15. The media processing system of claim 14, further comprising a graphics processor operable to process video data produced by the video decoder.

16. The media processing system of claim 14, further comprising a video encoder operable to encode the output of the graphics processor.

17. A method of operating a media processing system comprising:
receiving multiple transport streams by a transport processor;
demultiplexing by the transport processor the multiple input transport streams to generate a first video stream corresponding to a first program signal and a second video stream corresponding to a second program signal;
extracting by the transport processor from the multiple input transport streams first Program Clock Recovery (PCR) data corresponding to the first program signal and second PCR data corresponding to the second program signal;
based upon the first PCR data, generating by clock circuitry a first clock signal that is synchronized to a program clock for the first program signal; and
based upon the second PCR data, generating by clock circuitry a second clock signal that is synchronized to a program clock for the second program signal.

18. The method of claim 17, wherein receiving multiple transport streams by the transport processor comprises:
receiving by the transport processor a first input transport stream of the multiple input transport streams from locally stored programming; and
receiving by the transport processor a second input transport stream of the multiple input transport streams from an external source.

19. The method of claim 17, wherein receiving multiple transport streams comprises:
receiving by the transport processor a first input transport stream of the multiple input transport streams via a first wireless channel; and
receiving by the transport processor a second input transport stream of the multiple input transport streams via a second wireless channel.

20. The method of claim 17, further comprising the transport processor simultaneously video decoding first and second video streams extracted from the first and second program signals.

\* \* \* \* \*